United States Patent [19]

Padula et al.

[11] Patent Number: 5,581,052
[45] Date of Patent: Dec. 3, 1996

[54] PRESSURE SENSITIVE STYLUS HAVING RESILIENTLY COMPRESSIBLE TIP ELEMENT

[75] Inventors: Michael J. Padula, Sandy Hook; David Siefer, Orange; Frank Chiappetta, Woodbury, all of Conn.; Tomas Trousil, Herzlia, Israel

[73] Assignee: Summagraphics Corporation, Austin, Tex.

[21] Appl. No.: 506,900

[22] Filed: Jul. 26, 1995

Related U.S. Application Data

[63] Continuation of Ser. No. 138,931, Oct. 18, 1993, abandoned.

[51] Int. Cl.⁶ .................................................. G08C 21/00
[52] U.S. Cl. .................................................. 178/18; 345/179
[58] Field of Search ...................... 178/18, 19, 20; 345/179, 180, 181, 182

[56] References Cited

U.S. PATENT DOCUMENTS

| | | |
|---|---|---|
| 3,528,295 | 9/1970 | Johnson et al. . |
| 4,301,337 | 11/1981 | Eventoff . |
| 4,314,228 | 2/1982 | Eventoff . |
| 4,318,096 | 3/1982 | Thornburg et al. . |
| 4,451,714 | 5/1984 | Eventoff . |
| 4,492,819 | 1/1985 | Rodgers et al. . |
| 4,532,376 | 7/1985 | Rockwell . |
| 4,580,007 | 4/1986 | Searby et al. . |
| 4,667,182 | 5/1987 | Murphy ................................ 178/182 |
| 4,672,154 | 6/1987 | Rodgers .................................. 178/19 |
| 4,695,680 | 9/1987 | Kasle ....................................... 178/19 |
| 4,697,050 | 9/1987 | Farel et al. ............................ 178/18 |
| 4,786,764 | 11/1988 | Padula et al. ........................ 178/18 |
| 4,786,765 | 11/1988 | Yamanami et al. . |
| 4,810,992 | 3/1989 | Eventoff . |

Primary Examiner—Wellington Chin
Assistant Examiner—Paul Loomis
Attorney, Agent, or Firm—Rosen, Dainow & Jacobs, Limited Liability Partnership

[57] ABSTRACT

A stylus for use with a digitizer tablet has a tip element that includes a front portion with a tip for engaging the surface of the tablet, and a back portion of the tip element within the stylus housing. The back portion of the tip element is adapted to apply pressure to a pressure sensitive resistance element. The front and back portions of the tip element are coupled together by a spring, in order that the tip element be resiliently compressible in the axial direction of the stylus.

13 Claims, 4 Drawing Sheets

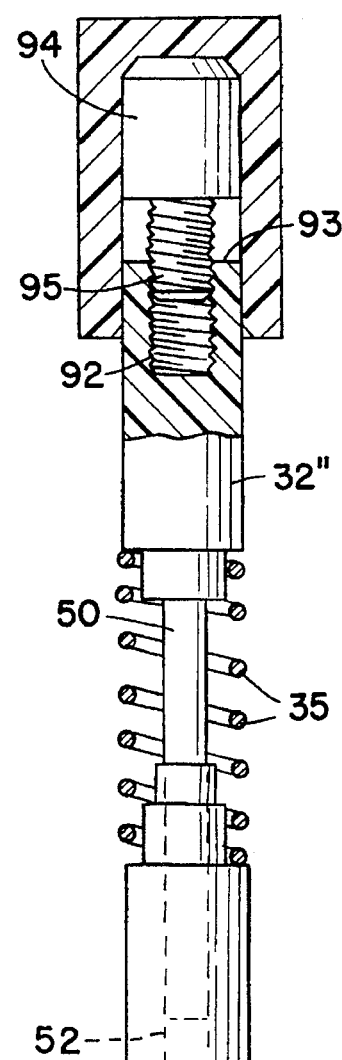
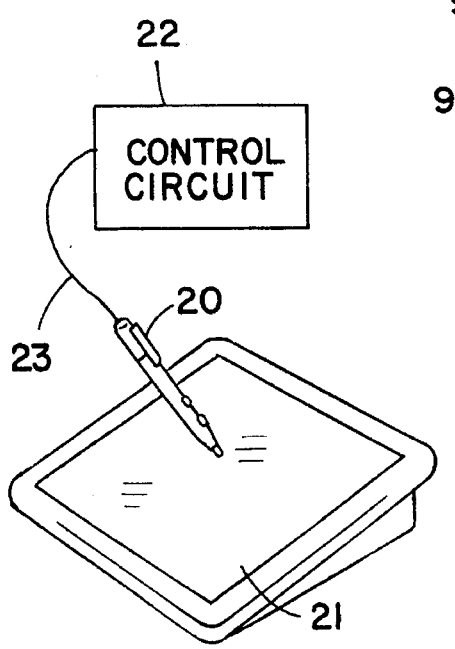
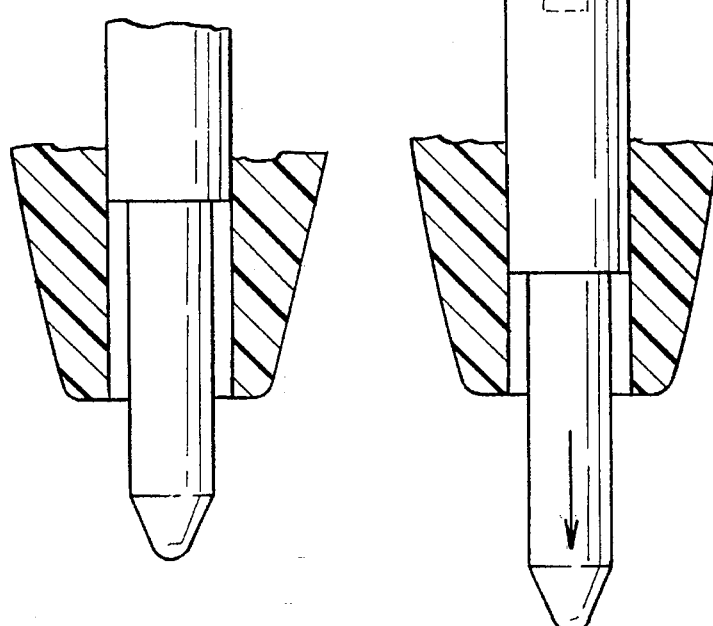

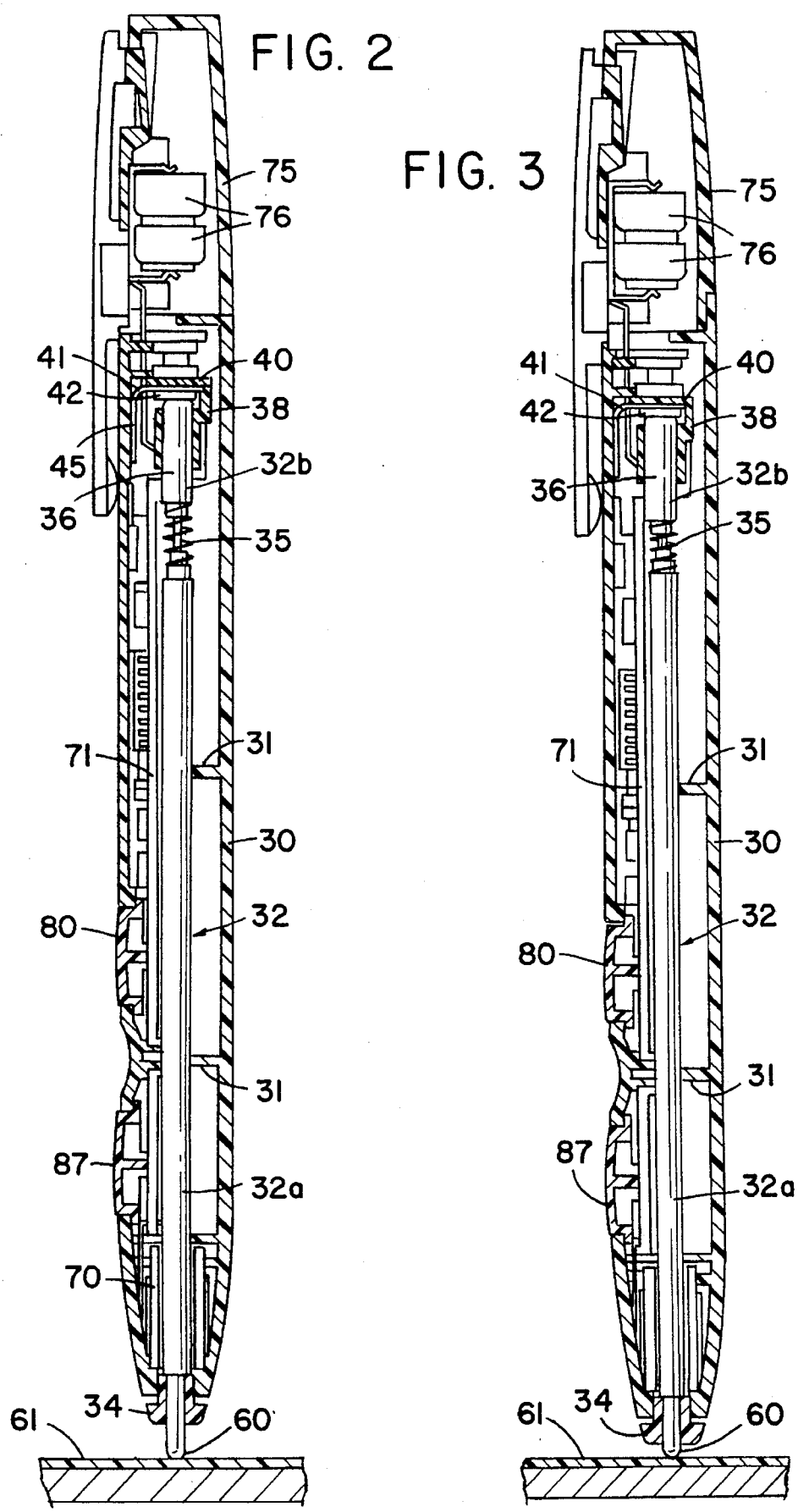

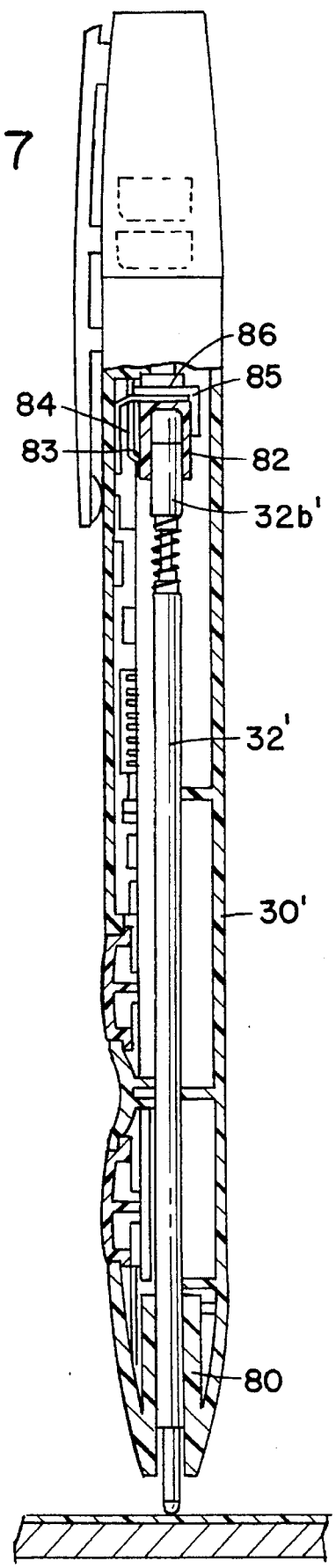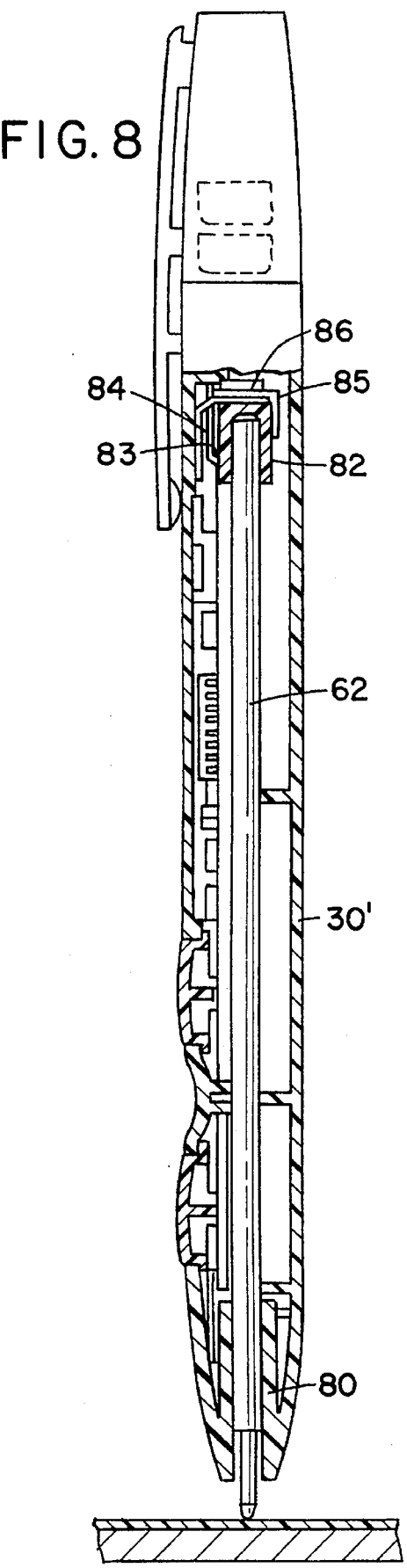

5,581,052

PRESSURE SENSITIVE STYLUS HAVING RESILIENTLY COMPRESSIBLE TIP ELEMENT

This application is a continuation, of application Ser. No. 08/138,931, field Oct. 18, 1993 now abandoned.

FIELD OF THE INVENTION

This invention relates to a pressure sensitive stylus, and is especially directed to a pressure sensitive stylus of the type adapted to be employed with a digitizer tablet, and having a force sensitive resistance element responsive to the application of pressure to the tip of the stylus.

BACKGROUND OF THE INVENTION

A known pressure sensitive stylus of the type to which the improvement of the present invention is directed is disclosed in U.S. Pat. No. 4,786,764 (now Re 34,095), Padula et al, the contents of which are incorporated herein by reference.

A typical assemblage of a stylus and a digitizer tablet is illustrated in FIG. 1, wherein a stylus 20, for example of the type disclosed in U.S. Pat. No. Re 34,095, or of the type of the present invention, is adapted to be pressed against a conventional digitizer table 21. The stylus may be coupled to a control circuit 22, such as a computer, via a cable 23, or the coupling may be made without direct cables, for example via conventional radio or light wave transmission. It will be understood of course that such coupling techniques to a control circuit are also applicable to the present invention.

The stylus disclosed in U.S. Pat. No. Re 34,095 includes a "refill" that is axially movable within a sleeve, the refill having one end protruding from the stylus and being adapted to be pressed against the surface of a digitizer table. The other end of the refill is positioned to apply axial pressure against a pressure sensitive resistance element, such as, for example only, an FSR (a known force sensitive transducer ink). The pressure sensitive resistance element is coupled to a circuit which may be external of the stylus, to enable a determination to be made of the amount of pressure being applied to the surface by the user of the stylus. This pressure can be used by an application program operating on a computer to determine whether the user is selecting an option on the screen or tablet surface, similar to a "mouse click" operation. Or, in graphic design applications, the measurement of the pressure can be used to effect a change in a parameter, such as the width of the "paint brush" being used.

The term "refill", as employed in U.S. Pat. No. Re 34,095 was exemplified by a conventional metal refill element for a pen. In order to avoid any erroneous connotation that this term is restricted to such a metal refill element, it is replaced herein by the term "tip" element. The term "tip" element, as used hereinafter, refers to an elongated tip element, which may be conductive or nonconductive, and which is fabricated to effect the transfer of pressure on the exposed tip of the tip element to a pressure sensitive resistance element. The term "tip" element thus includes refill elements of the type disclosed in the above patent.

SUMMARY OF THE INVENTION

Briefly stated, the present invention is directed to a pressure sensitive stylus of the above type, wherein the tip element is selectively either an axially resilient element or an element that is not axially resilient.

In one embodiment of the invention, the tip element is a rod like body with tip portion and a back portion that are separated by a spring. The tip portion is adapted to project from the stylus to engage a surface, and the back portion is shaped to apply pressure to the pressure sensitive resistance element, for example, in the same manner as in U.S. Pat. No. Re 34,095. Travel of the tip portion, or tip element compression, is proportional to the forces applied and is determined by the springs mechanical attributes.

The invention permits tip travel when the stylus is employed with a pressure sensitive pen or stylus. Alternatively, the invention allows the same stylus to be used for both handwriting applications (using a standard tip element that is not axially compressible) and artist applications (using an axially resilient tip element, e.g. a tip element with a spring between its tip portion and the back portion).

BRIEF DESCRIPTION OF THE FIGURES

In order that the invention may be more clearly understood, it will now be disclosed in greater detail with reference to the accompanying drawings, wherein:

FIG. 1 is a partially perspective view of a known combination of a stylus and a digitizer tablet which may employ the stylus of the invention;

FIG. 2 is a partially cross sectional view of a stylus in accordance with one embodiment of the invention, in combination with a portion of a digitizer tablet;

FIG. 3 is a partially cross sectional view of the stylus of FIG. 2, wherein the tip of the tip element is pressed against the surface of a digitizer tablet;

FIG. 7 is a partial cross sectional view of a stylus in accordance with a modification of the stylus of FIG. 2, employing an axially resilient tip element;

FIG. 8 is a partial cross sectional view in accordance with FIG. 7, with the tip element not being axially compressible;

FIG. 9 is a cross sectional view illustrating a modification of the axially resilient tip element; and FIG. 10 is a cross sectional view in accordance with FIG. 9 in which the tip element has been adjusted to receive a spring of different length.

DESCRIPTION OF THE PREFERRED EMBODIMENTS

Figure 4:
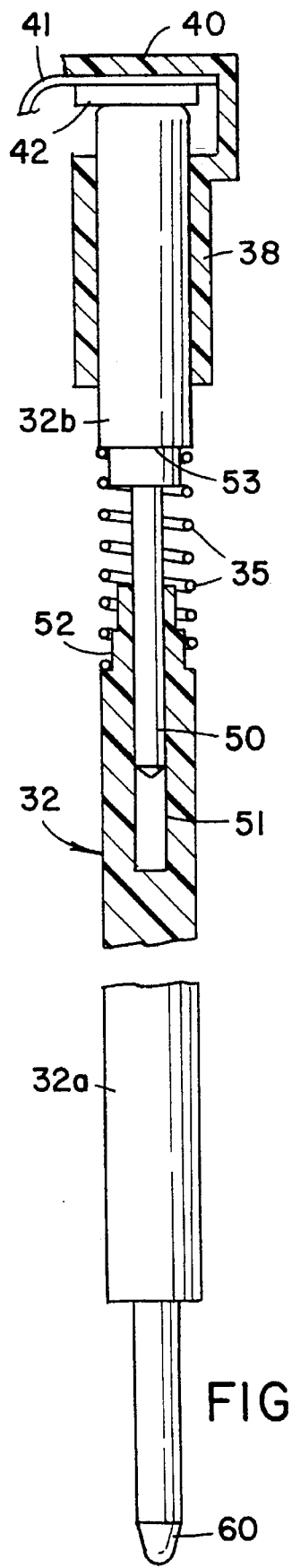
FIG. 4 is a partially cross sectional view of one embodiment of a tip element in accordance with the invention, in its expanded state.

Referring now to the drawings, FIG. 2 illustrates one embodiment of a stylus in accordance with the invention. The stylus includes an elongated hollow (preferably cylindrical) main housing 30 having internal ribs 31 or the like for coaxially supporting a tip element 32 for axial movement therein. The tip element 32 includes a tip portion 32a and a back portion 32b. The tip portion 32a extends through a hole at the front end of the main housing, and a bushing 34 threaded in this hole guides the thus extending portion of the tip portion 32a. The diameter of the portion of the tip portion extending through the bushing may be reduced, as compared with the portions thereof extending within the main housing, in order to enable the tip element to be held within the main housing by the bushing, but to be removable therefrom upon removal of the bushing.

The tip portion 32a of the tip element is coupled to the back portion 32b thereof in such a manner that the tip element is resiliently compressible. While specific constructions of this combination will be discussed in greater detail in later paragraphs, FIG. 2 illustrates a helical compression spring 35 between the two portions of the tip element that may serve this function.

The back portion 32b has a preferably cylindrical end 36 extending into and guided by a sleeve 38 fixedly held in the main housing 30. A wall 40 extends across the rear of the sleeve 38, transversely of the axis of the housing 30, and a pressure sensitive resistance element 41 is provided between the left side of the wall 40 and the end 36 of the back portion 32b. A plate 42 of plastic or the like may be provided between the back portion 32b and the pressure sensitive resistance element 41, in order to avoid damage to the pressure sensitive resistance element.

As seen in FIG. 2, in the fully extended state of the tip element, the enlarged diameter portion at the front of the tip portion engages the inside surface of the bushing 34, and the spring is compressed only sufficiently so that the minimum pressure is applied to the pressure sensitive resistance element. Circuitry of the type disclosed in U.S. Pat. No. 4,786,764 may be coupled to the pressure sensitive element in order to detect the occurrence of such a threshold pressure.

The pressure sensitive element 41 may be of the type disclosed in U.S. Pat. No. Re 34,095. It may thus include a layer of a force sensitive resistance (FSR) ink, for example as manufactured by Interlink Electronics, Inc. of Santa Barbara, Calif., and as disclosed in U.S. Pat. No. Re 34,095 to Padula et al.

Transducers of the type disclosed in U.S. Pat. No. Re 34,095 are disclosed in U.S. Pat. Nos. 4,628,815; 4,301,337; 4,314,227; 4,314,228; 4,315,238; 4,451,714 and 4,489,302, all to Eventoff.

The disclosures of the patents cited above as well as the literature publicly available from Interlink Electronics, Incorporated, will enable one skilled in the art to design a transducer having a suitable ink composition, ink specification, resistance/force (or pressure) and such other parameters as the size, shape, hardness, etc. of the part that applies force to the transducer.

The stylus illustrated in FIG. 2 is a cordless stylus, although it is apparent that the invention is not limited to this feature, and may alternatively be coupled to a control device via a cable, as illustrated in FIG. 1. Cordless coupling arrangements are disclosed, for example, in copending U.S. patent application Ser. No. 08/039,608 filed Mar. 24, 1993, the contents of which are incorporated herein by reference.

The stylus illustrated in FIG. 2 employs electromagnetic coupling of data from the digitizer. Thus, in this embodiment, the tip portion 32a of the tip element passes through coil 70 positioned in the housing. Alternatively, the stylus may employ capacitive coupling, in which case the tip portion of the stylus may be conductive, and the tip portion may form a capacitive plate coupled to the digitizer tablet. This invention is applicable to all known stylus designs, including the following patents: U.S. Pat. Nos. 4,289,927; 4,672,154; 4,786,765; 5,247,137; and 5,138,118.

The stylus illustrated in FIG. 2 further includes a rear housing portion 75 removably fit to the rear of the main housing 30. The rear housing portion 75 may include suitable batteries 76 to provide operating current for the circuits of the stylus, as well as other required components (not shown) if necessary. The invention is not limited, however, to the circuitry employed in the stylus.

The stylus may also include various operating buttons extending through apertures in the main housing 30. For example, a zoom button 80 and a move button 87 may be held in the side of the main housing and engagable with suitable switch elements on the circuit board 71, to permit the operator to control various functions of the stylus. Consistent with the intent of this patent, these buttons could also be pressure sensitive, and a resilient button could be provided. The operation of this resilient side button could be used by the graphic arts application program, for example, to simulate the operation of an airbrush. The invention is not limited, however, to the provision of a stylus with such features.

FIG. 2 illustrates the condition of the stylus when the extending tip 60 of the stylus is just touching the surface 61 of digitizer tablet 21, so that a minimum pressure is applied to the pressure sensitive resistance element 41. FIG. 3, on the other hand illustrates the stylus of FIG. 2 wherein the stylus is pressed toward the digitizer surface 61 sufficiently to compress the spring 35. This pressure on the stylus has permitted axial movement of the tip 60 before the pressure applied to the pressure sensitive resistance element is sufficient to vary the resistance thereof to constitute a measurable change in resistance.

Figure 5:
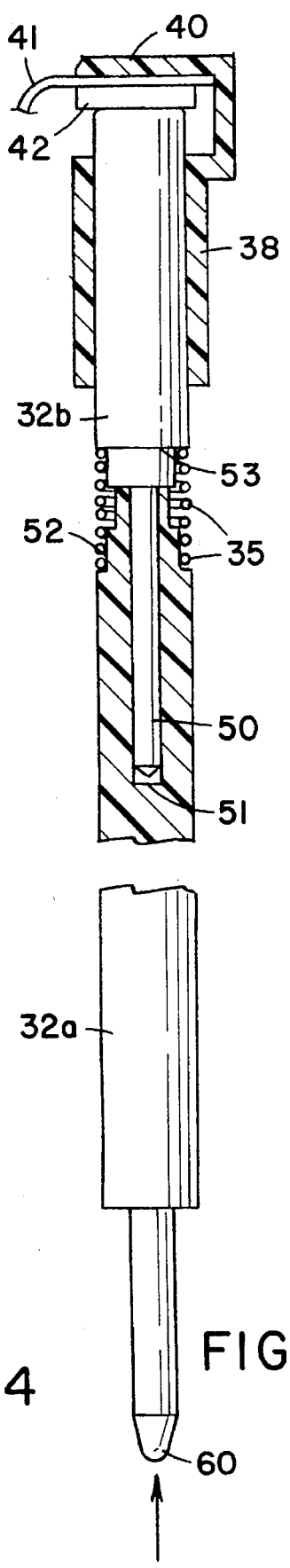
FIG. 5 is a partially cross sectional view of the tip element of FIG. 4 in a compressed state.

FIG. 4 illustrates one embodiment of a resiliently compressible tip element in accordance with the invention. In this element, the back portion 32b has a central coaxial pin 50 extending forwardly therefrom into a central guide hole 51 in the rear of the tip portion 32a. The pin is axially slidable in the hole 51. The helical compressible spring 35 extends from a shoulder 52 formed in a rear surface of the tip portion 32a to a shoulder 53 on a forward surface of the back portion 32b, the spring urging the tip and back portions in opposite directions. As seen in FIG. 5, when pressure is applied to the stylus, the spring 35 is compressed. The displacement of the tip 60 and the compression of the spring are proportional to the forces applied to the tip, and are determined by the spring characteristics. It is thus apparent that the force applied to the pressure sensitive element varies as a function of the displacement of the tip 60 of the tip element 32, when the tip element is resiliently compressible in accordance with the invention, to thereby enable the operator to maintain greater control over the operation of the stylus.

It will be apparent, of course, that the pin may alternatively extend from the tip portion to be received in a hole in the back portion.

Figure 6:
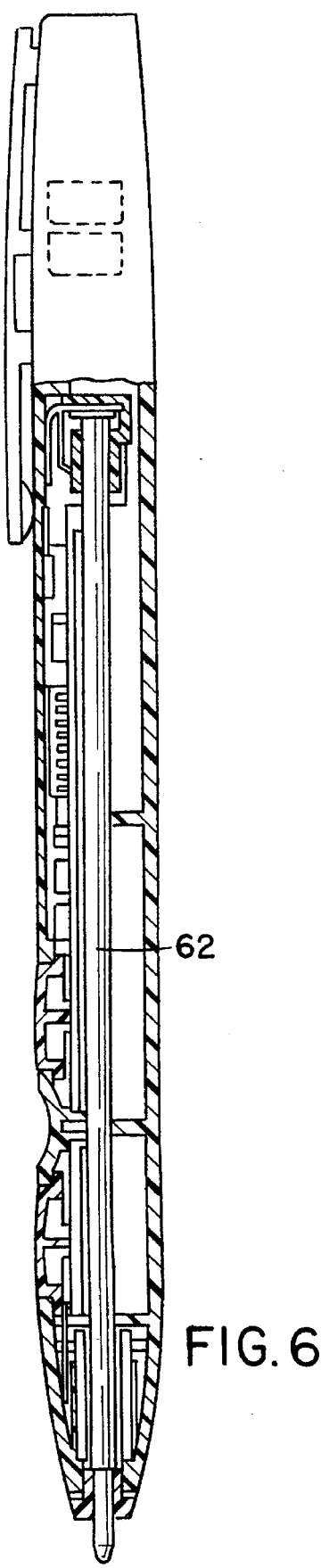
FIG. 6 is partially cross sectional view of the stylus of FIG. 2, wherein the axially resilient tip element has been replaced by a tip element that is not axially resilient.

FIG. 6 illustrates a stylus in accordance with FIG. 1, with the exception that the axially compressible tip element has been replaced by a conventional tip element 62. Thus, in accordance with the invention, the characteristics of the stylus may be changed, for different applications, by selectively installing either a conventional non-compressible tip element or an axially compressible tip element, in the stylus. The replacement of the tip element can be readily effected by unthreading the bushing 34 from the front of the stylus, pulling out the tip element from the front of the stylus, inserting a new tip element into the main housing, and replacing the bushing 34.

FIG. 7 depicts a modified stylus wherein the main housing 30' is provided with a guide sleeve 80 at its forward end for axially guiding the tip element. In this embodiment of the invention, the rear end of the back portion 32b' of the tip element 32' is fit into a socket 82, for example of nylon, the friction of the fit holding the tip element 32' within the main housing. The socket 82 is mounted within the main housing for limited axial movement, for example having a guide projection 83 slidable in a guide groove 84 fixedly held in the main housing. The socket is further guided in a fixed sleeve 85, with the pressure sensitive element 41 being positioned between an inside wall of a bottom 86 of the sleeve and the rear end of the socket 82.

As illustrated in FIG. 8, the stylus of FIG. 7 is also adapted to receive and hold a conventional tip element, with the rear end of the tip element 62 being frictionally held in the socket 82.

FIGS. 9 and 10 illustrate a modification of the invention wherein the effective length of the back portion 32" may be varied, in order to enable the use of springs or tips of different length. As illustrated in FIG. 9, the back portion 32" of the tip element includes a front cylindrical end 91 from which the pin 50 projects into the hole 52. A threaded hole 92 extends axially into the rear end 93 (upper end in the drawings) of the end 91. An adjusting element 94, preferably being cylindrical and having the same diameter as the end 91, has a forwardly extending screw portion 95 that is threaded into the threaded hole 92. It is thus apparent that the effective length of the back portion 32" can be varied by suitable rotational displacement of the adjustment element 94.

The back portion 32" can be frictionally fit into the sleeve 85, as in the manner illustrated in FIGS. 7 and 8. Alternatively, the tip element of FIG. 9 can be retained by a bushing (not illustrated) and sleeve in the manner illustrated in FIGS. 2 and 3.

FIG. 9 illustrates the adjustment element 94 adjusted so the screw portion 95 is fully engaged in the threaded hole 92, to achieve the shortest adjustment of the length of the back portion 32". FIG. 10 illustrates the adjustment element angularly displaced so that the effective length of the back portion 32" is greater than that illustrated in FIG. 9, to thereby enable the use of a spring 35 or tip of different length.

The invention allows the tip to be axially displaced when it is employed with a pressure sensitive pen or stylus. The invention also permits the same stylus to be selectively used for both handwriting applications (using a conventional tip element without springs) and for artist applications (using the axially resilient tip element).

Although the tip element has been depicted as extending a substantial distance into the stylus, it will be apparent that the invention is not limited to this feature, and the tip element may be shorter, accompanied with suitable displacement of the position of the pressure sensitive element.

While the invention has been disclosed and described with reference to a limited number of embodiments it will be apparent that changes and modifications may be made therein, and it is therefore intended in the following claims to cover each such variation and modification as falls within the true spirit and scope of the invention.

What is claimed is:

1. In a stylus for use with a digitizer tablet having a working surface, wherein the stylus has a housing, an elongated tip element axially movable in said housing with one end of said tip element extending from said housing and being positioned to be pressed against the working surface of the tablet and the other end of said tip element being positioned within said housing, and a pressure sensitive element positioned within said housing to receive axial pressure from the other end of said tip element resulting from pressure on said one end thereof, the improvement wherein said tip element is resiliently axially compressible.

2. The stylus of claim 1 wherein said resiliently axially compressible tip element comprises a tip portion mounted to have a tip end extend from said housing, a back portion within said housing positioned to engage said pressure sensitive element, and a spring coupling said tip and back portions within said housing.

3. The stylus of claim 1 wherein said pressure sensitive element is a pressure sensitive resistance element.

4. A tip element for a stylus comprising first and second axially aligned tip element portions, and means for resiliently coupling said first and second tip element portions, whereby said tip element is axially resiliently compressible.

5. The tip element of claim 4 wherein said means for resiliently coupling said first and second tip element portions comprises a helical compression spring.

6. The tip element of claim 5 further comprising means for adjusting the length of one of said first and second tip element portions.

7. The tip element of claim 4 wherein one of said first and second tip element portions has a pin mounted to slide axially in a central hole the other of said first and second tip element portions.

8. The stylus of claim 2 further comprising a socket element mounted within said housing so as to be axially movable within said housing, said socket holding said back portion of said tip element.

9. The stylus of claim 2 wherein said housing is provided with a sleeve for axially guiding said tip portion of said tip element.

10. A tip element for use in a stylus used with a digitizer tablet, the stylus having a housing and a pressure sensitive element positioned within the housing, the tip element comprising a first end at least a portion of which extends from the housing and is positioned to be pressed against the tablet and a second end positioned within the housing to apply axial pressure to the pressure sensitive element when pressure is applied to the first end, the tip element assuming a first configuration when pressure is not applied to the first end and a second configuration when pressure is applied to the first end, wherein in the second configuration the first end of the tip element is not displaced by the same amount as the second end as compared to the first configuration.

11. The tip element of claim 10 wherein the first end comprises a tip portion mounted to have a tip end extend from the housing, wherein the second end comprises a back portion positioned within the housing to engage the pressure sensitive element, and wherein the tip element further comprises means for resiliently coupling the tip and back portions to return the tip element from the second configuration to the first configuration when pressure ceases to be applied to the first end.

12. The tip element of claim 11 wherein the means for resiliently coupling comprises a helical compression spring.

13. The tip element of claim 11 wherein one of the tip and back portions of the tip element has a pin mounted to slide axially in a central hole of the other of the tip and back tip element portions.

* * * * *